March 6, 1956 T. S. COLE 2,737,604
SELF-STARTING SYNCHRONOUS MOTOR
Filed April 26, 1955 3 Sheets-Sheet 1

INVENTOR.
Theodore S. Cole.
BY R. S. Kelley
ATTORNEY.

March 6, 1956 — T. S. COLE — 2,737,604
SELF-STARTING SYNCHRONOUS MOTOR
Filed April 26, 1955 — 3 Sheets-Sheet 2

INVENTOR.
Theodore S. Cole.
BY R. S. Kelley
ATTORNEY.

March 6, 1956 T. S. COLE 2,737,604
SELF-STARTING SYNCHRONOUS MOTOR
Filed April 26, 1955 3 Sheets-Sheet 3

INVENTOR.
Theodore S. Cole
BY R. S. Kelley
ATTORNEY 2,737,604
SELF-STARTING SYNCHRONOUS MOTOR Theodore S. Cole, Deep River, Conn.

Application April 26, 1955, Serial No. 503,967

18 Claims. (Cl. 310—164)

My invention relates to small synchronous motors such as used for clocks, all kinds of timing devices, control apparatus and time-delay mechanisms, and which are often called timing motors.

Some of the objectives are a synchronous motor of small size, low cost and exceptionally long life, which shall always be self starting, and which will operate quietly; a motor in which the maximum power output is comparatively high, so that it is adaptable to wide variety of uses. From the standpoint of cost it is important that the motor have only one single phase winding.

In common with all such motors, the motor of my invention has a stator system, exciting coil, rotor, shaft, and bearings. Also the watt efficiency of my new motor, while greater than most, is low. A large amount of leakage flux is present and in the description of the operation which follows, only the major actuating fluxes need be considered.

So far as is known my invention provides a motor which has wholly new features of construction and is entirely new in its principle of operation. In order to understand how it differs basically from other types of timing motors, three existing types may be briefly considered.

1. Shaded pole hysteresis motors: All hysteresis type motors use a split phase or shaded pole construction in their stator systems to set up a so-called rotating field. The rotor in these motors must have a component, usually in the shape of a rim, made from permanent magnet steel or alloy on which poles are induced by the stator flux. They operate normally at synchronous speed due to the retentivity of the hardened steel component of the rotor. There are no salient poles in this component, but when the motor is running synchronously various portions of it are in effect, permanent magnets which do not change substantially either in position or polarity. In their simpler and cheaper forms these motors have extremely low power output being rated at one to six inch ounces, which is the torque which a motor will develop when geared down to one R. P. M.

2. Inductor or impulse motors with permanent magnet rotors: The permanent magnet component has salient poles which of course do not change their polarity, and in the comparable sizes develops many times the torque of the hysteresis motor. However, the material which must be used for the permanent magnet component, Alnico for example is very expensive and in any case loses its magnetic strength over a period of a few years. Also these motors are not wholly reliable in starting.

3. Induction start salient pole, harmonic pull in motors or reluctance motors: These are not strictly speaking synchronous motors. All variants of this type must have and cannot function without low conductivity current paths in the rotor, in which are induced current from the linking stator flux. These currents, in turn, set up electromagnetic fluxes which react with the so called revolving stator field to produce rotor rotation at something less than stable synchronous speed. My rotor has no conducting paths and in no way depends on induced electromagnetism in the rotor. Hence, it does not belong to this class of motors in any way.

The motor of my invention does not depend on any of the principles or upon any combination of the principles on which the above described timing motors operate.

One of the practical results of my invention is that the high rotor torque of salient pole synchronous motors is obtained without the use of permanent magnets. This high torque is maintained throughout the life of the motor because there are no permanent magnets to gradually lose their magnetic strength or be affected by line transients.

A rotor-stator system is obtained, in which the angular motion of the rotor poles is not only in exact synchronism with the exciting stator flux but, also, the motion between poles is more nearly simple harmonic than in hysteresis motors. That is, the torque angular displacement time curve has no secondary harmonics of large amplitude when the motor is running at synchronism to be passed on to the gear train and cause noise. This is an important factor in that much of the noise in hysteresis motors stems from a large second harmonic in the torque curve.

Except the permanent magnet type where the (ability to start) life may also depend on the rotor's retention of its magnetism, the life of nearly all timing motors is determined by the rotor bearing wear or wear in the gear train. Bearing wear which is usually expressed as pressure (P) times rubbing velocity (V) equals a constant, which in turn depends on the type of materials and lubrication. Obviously, then, for long bearing life both P and V are held to the lowest possible values. In hysteresis motors, which constitute the great majority of all timing motors, the shaft size has been standardized by experience to about $\frac{1}{16}''$ in diameter and the R. P. M. to about 500, thus making V about 8 ft. min., which is far too low to generate and maintain an oil film. Consequently, the bearing wear and accompanying noise increases rather rapidly unless the bearing pressure is very low, which is a condition almost impossible to meet in practice in present motors.

Unfortunately, for all timing motors with rotors operating in a so-called rotating field (distortion produced by shading auxiliary poles), the radial component of the linking flux across the air gap must be several hundred times the tangential component that furnishes the torque. Due to the summation of normal magnetic and mechanical tolerances in the assembly of component parts, the narrow air gap (about .007") and concentricity of the rotor therein may vary considerably from sample to sample and often in the same sample motor. This variation, when the summation of the tolerances is adverse may, and often does, result in large unbalanced radial forces, which in turn cause relatively large bearing pressures on the sleeve type rotor shaft bearings. For example, in a motor rated at 5 inch oz., I have measured unbalanced radial forces on the rotor of as much as 100 gms. Naturally, this resulted in rapid bearing wear and an increase in the noise level to a point where the motor became useless for most applications. It is an object of my invention to overcome these fundamental defects.

Roughly, the force of attraction between a magnet and its keeper when separated by a short distance is proportional to the square of the flux density, assuming same cross section, materials, etc. In hysteresis motors, the length of the permanent magnets induced on the rotor rim (magnet steel) is often only $\frac{1}{8}$ of an inch and the field intensity high, which results in a relatively high flux density.

In my motor, the radial spokes or momentary magnets are fully twice as long and the field intensity much lower which results in a very low flux density across the radial air gap and hence low radial forces. By actual measurements, even when the rotor is as eccentric in the air gap as much as it is ever likely to be in normal manufacture, the unbalanced radial forces were less than 10% of those found in hysteresis motors rated at only ⅛ the power output of my motor. This results of course in a much greater useful life of the sleeve bearing in which the shaft rotates.

These and other results and advantages of my invention will be more readily understood from the following detailed description of one embodiment which the invention may assume in practice, and which is illustrated in the accompanying drawings.

Figure 1:
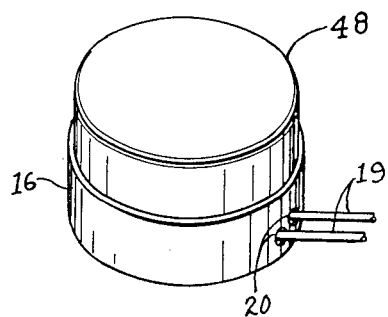
Fig. 1 is a perspective view to indicate what may be the external appearance of a typical motor made according to my invention.
Figure 2:
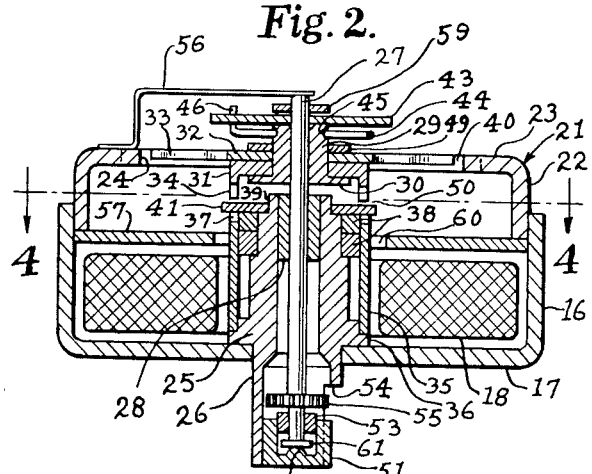
Fig. 2 is a central cross-section along the motor axis which for convenience may be referred to as the vertical axis, and with the cover cap removed.

The motor is contained generally in a cylindrical coil cup 16 having a flat bottom 17 and this part can readily be drawn from soft sheet steel stock. The exciting coil 18 is contained inside the cup 16, resting against the bottom 17 and the coil may be connected to a suitable source of alternating current by the terminals 19 which lead out through openings 20 in the coil cup. The coil may be of any standard size and make and for a typical timing motor I prefer to use a 200 ampereturn coil of about 5000 turns of lacquered wire, the outside diameter of the coil being approximately 1½ inches.

The coil cup extends above the coil 18 and an outer stator member 21 is fixed firmly thereto as by a depending skirt portion 22 having a press fit against the inner cylindrical surface of the coil cup. The horizontal flange 23 of the member 21 terminates in a series of teeth 24 which extend radially inwardly and provide a plurality of circularly arranged equally spaced outer stator poles the number of which will depend on the desired motor speed. I have shown sixteen such poles which will result in a motor speed of 450 R. P. M. with a sixty cycle current. This part may also be readily made from soft iron or steel.

Extending axially through the coil is a hollow inner soft iron core part 25 fixed firmly and directly to the coil cup 16 as by a reduced hub 26 which has a tight fit in a central hole in the bottom 17 of the coil cup. The rotor shaft 27 extends centrally through the inner core part and is supported by a sleeve bearing 28 fixed in the upper end of the core part 25 and by a thrust bearing in the hub extension 26, which thrust bearing will hereinafter be described in more detail. Fixed to the upper end of the shaft 25 is a flanged collar or bushing 29 which is made of a suitable non-magnetic material such as brass. Surrounding this collar and secured as by a press fit in fixed relationship thereto against the flange 30 of the collar are the lower and upper rotor components 31 and 32 respectively, which for convenience are sometimes referred to herein as the axial and radial rotor components. The overall diameter of the radial component is substantially larger than the diameter of the axial component.

Figure 5:
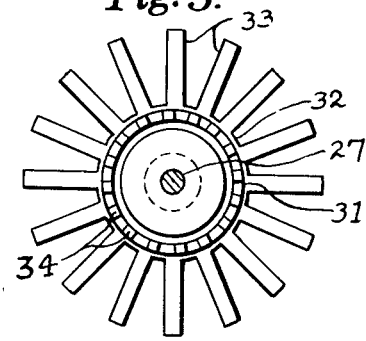
Fig. 5 is a bottom plan view of the rotor components on line 4—4 of Fig. 2 looking upwardly.

The radial rotor component as best seen in Fig. 5 has equally spaced radially extending spokes or teeth 33 equal in number (16) to the outer stator pole teeth and horizontally aligned with these stator teeth. The member 32 or at least the teeth 33 thereof are made of a material having markedly higher magnetic retentivity than the material of the surrounding stator member 21, and preferably this member is stamped out of high carbon steel such as ordinary tool steel and afterwards quench hardened. The radial air gap 40 between the ends of the rotor teeth 33 and stator teeth 24 (when the teeth are in radial alignment) is preferably about .020" allowing of course for manufacturing tolerances of plus or minus about .003".

The lower rotor component 31 is a disc shaped member of soft iron or steel having a depending flange formed into sixteen axially extending teeth 34 preferably of rectangular cross section providing another set of salient rotor poles, each of which, in the example shown, as seen in Fig. 5, is displaced angularly from the midpoint between the two adjacent radial rotor teeth 33. Such displacement is preferably about 40 electrical degrees, which is actually (in the case of 16 poles) only 5 angular degrees, in a counter-clockwise direction from such midpoint as viewed from the top, or in a clockwise direction as seen in Fig. 5.

The stationary central core, in addition to the inner part 25, has an outer cylindrical part or shell 35 of soft iron or steel seated tightly around a stepped shoulder 36 near the bottom of the inner part 25. It extends upwardly in spaced relation to said inner part and terminates in a series of axially extending teeth 37 whose number (eight) is one half the number of the axial rotor teeth 34. These teeth 37 are of course in alignment (axially) with the rotor teeth 34 and separated therefrom by an axial air gap 50 which is closely controlled and is much narrower than the radial air gap 40, preferably about .005".

Figure 4:
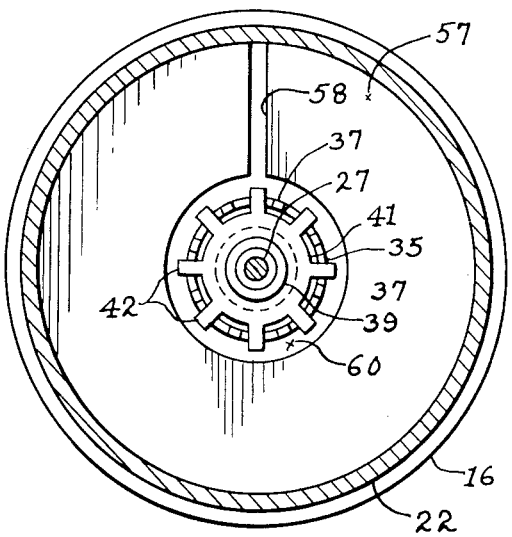
Fig. 4 is a horizontal cross-section looking downwardly on line 4—4 of Fig. 2.

One or more and preferably two shading rings 38 of good current conducting material such as copper, surround the upper portion of the inner core part 25. The amount of shading may be varied to get the desired result but preferably it is such as to cause the flux flowing out of the inner core part to lag behind the in-phase flux in the outer core shell by about 40 electrical degrees. The purpose of these shading rings should not be confused with shading rings in other synchronous motors where they are employed to produce some sort of unidirectional rotating field acting on an induced permanent magnet rotor component. The shading rings in my motor are used simply to cause a flux lag which acts on soft iron pole pieces (not permanent magnets) to create a non-directional or oscillating torque. Fitted tightly upon the reduced diameter end 39 of the inner core part 25 is a spider 41 also of soft iron or steel having spokes or teeth 42 (see Fig. 4) of the same number as the teeth 37 on the core outer shell, and extending outwardly into the spaces between the shell teeth. These spider teeth 42 are offset about 40 electrical degrees from the midpoints of the spaces between the shell teeth in one direction or the other, clockwise as herein shown. Thus the axial rotor teeth 34 cannot line up at the same time with both the spider teeth 42 and the shell teeth 37. In other words only half of the axial rotor teeth can line up with the core teeth at any instant of time. The spider and shell in effect provide a compound stator system in which the in-phase flux in the outer path passes through one half the poles across the axial air gap 50 into the axial rotor component while a behind-phase flux passes through the other half of the poles which latter half are also "off angle" with respect to the first half.

The axial air gap 50 should be closely controlled. The upper flat surfaces of both the shell teeth 37 and the spider teeth 42 may be accurately ground after the core parts are assembled on a shaft or mandrel so that they will lie precisely in a plane perpendicular to the shaft. Likewise the bottom surfaces of the axial rotor teeth may be ground after assembly on the shaft 27. All of the axial rotor and stator teeth are preferably right prisms so that they do not change shape or cross section when ground to a plane perpendicular to the shaft.

In order to amplify the oscillations of the rotor in starting which will be made more clear in the description of the method of operation, there is employed what may be termed an impulse imparting member in the form of a disc 43, preferably of non-magnetic material such as stainless steel or brass, loosely mounted around the end of the rotor shaft 27 resting upon the end of the collar 29. This disc 43 has a frictional connection with the rotor through some such means as a constant friction spring which may take the form of a U-shaped wire spring 44 whose mid portions are bent so as to bear against the collar 29 in the groove 45, and the upturned ends 46 of which are engaged in holes 47 in the disc. The moment of inertia of the disc 43 or impulse imparting member is approximately ¼ of the moment of inertia of the rotor per se.

Figure 16:
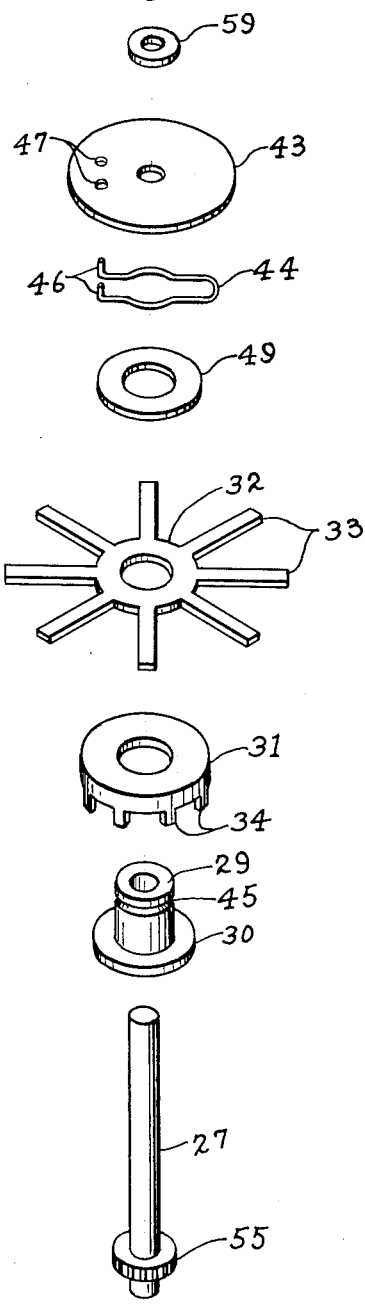
Fig. 16 is an exploded view of the rotating parts.
Figure 17:
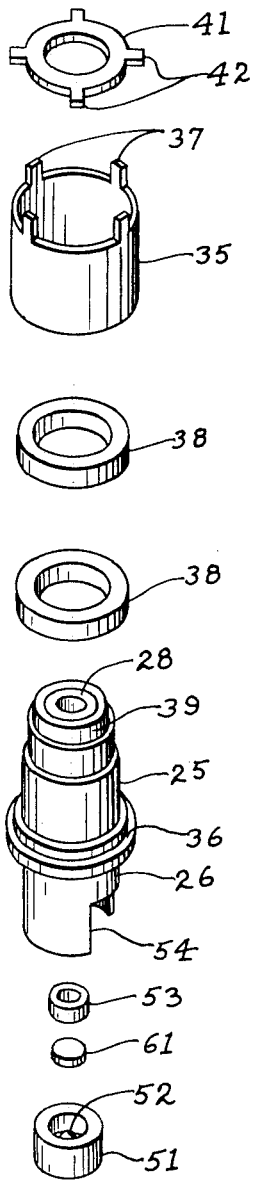
Fig. 17 is an exploded view of the stator parts.

If desired a suitable cover cap 48 may be fitted over the stator member 21. Also in order to insure that the rotor components are held firmly in place against the flange 30 a washer 49 is secured in place against the upper rotor component by suitable means as by staking it to the collar. Also a washer 59 may be secured to the shaft above the disc 43 in slightly spaced relation to the disc. The shape of each of the rotor and stator parts may be more readily understood from the isometric views, Figs. 16 and 17. In these views however for convenience in illustration only ½ the number of rotor and stator poles are shown.

In view of the high endwise pressure on the rotor shaft because of the relatively strong axial forces acting across the axial air gap, special attention has been given to the thrust bearing at the bottom end of the shaft. A cup shaped bearing housing 51 is threaded or otherwise secured into the bottom end of the hub shaped extension 26 of the core part and the bottom of this housing has a ball or dome-shaped inward projection 52 upon which floats a small flat ground jewel 61 which may be of relatively inexpensive Corundum. The hardened steel rotor shaft passes through a suitable sleeve bearing 53 fixed in the bearing housing. Thus a low friction self aligning bearing of long life is assured.

The axial air gap 50 may be accurately predetermined in manufacture by inserting a U-shaped shim between the axial rotor teeth and the core teeth and moving the bearing housing until the jewel bearing is tight against the end of the shaft and then removing the shim. If desired the axial air gap may also be adjusted since the bearing housing may be threaded into the hub extension 26. The hollow hub extension 26 is cut away on one side as indicated at 54 to expose a gear 55 fixed to the rotor shaft and from which the power of the motor may be transmitted.

While the motor is shown with the shaft in a vertical position it will of course operate in any position. The rotor may be prevented from moving out of place by the cover 48 itself or by a simple leaf spring 56 attached as by spot welding to the stator member 21 with its free end bearing against the crowned end of the rotor shaft. The spring also tends to prevent noise or chatter when the motor is operated in inverted position.

In order to divert a part of the flux from the rotor stator system there may be inserted a magnetic shunt in the form of a washer 57 of soft iron or steel which may be tightly fitted inside the coil cup 7 below the outer stator member 21. The central hole through the washer is large enough to leave an annular air gap 60 between the washer and outer core part or shell 35. Thus the reactive component of all the coil's impedance and the power input or output of the motor may be varied depending on the width of the air gap 60. This washer may be radially slotted as at 58 to reduce eddy current heat.

*Method of operation*

When the coil 18 is energized from a single phase line, an alternating field H is set up which produces an alternating flux, which in the first half cycle passes through the inner and outer core paths, into the rotor across the axial air gap 50, through the soft iron axial teeth 34 of the lower rotor component 31, into the hardened steel upper rotor component 32 and out through its radial rotor teeth 33, across the radial air gap 40 into the soft iron stator teeth 24, back through coil cup 16 to the bottom of the core system, and reversely when the field becomes negative on the next half cycle. The hardened steel rotor teeth 33 must not be confused with permanent magnets, since they go through a complete cycle from north to south with the field.

Because my new motor has no permanent magnets, either premagnetized or induced in place while in operation, it follows that as the field and flux alternates, all the teeth, both in rotor and stator components through which this flux passes, must also alternate or pass from north to south or vice versa at each cycle of the applied field.

This being the case, the dominant action or force between any set of stator teeth and its corresponding rotor teeth must be one of attraction, in exactly the same manner that the soft iron armature of an electromagnet is attracted to its core. This force of attraction occurs twice during each cycle of the exciting field because the force of attraction depends on the square of the flux density and, hence, is independent of its direction of flow.

Therefore, the rotor teeth can be considered as a series of equally spaced small armatures that are attracted by the stator poles by two pulses of flux during each cycle of the applied field (360 electrical degrees). Hence, when running at synchronism, each pair of rotor-stator poles may be considered as "locked in step" with the peaks of the flux flowing through them at a time when each pair is near alignment and passing on to the next point of alignment during the valleys of the flux flow. Because this sequence happens twice during each cycle of the applied field, the rotor turns through 180 electrical degrees per radial or axial stator pole. Because there must be a flux linkage between the stator and rotor poles, the flux that enters or leaves the radial pole tips must leave or enter the rotor system at some other point. In the case of my new motor, this is through an equal number of equally spaced axial rotor poles. Or to put it another way, two rotor poles, one axial and one radial, are needed for every 180 electrical degrees of rotation.

At starting from rest, any rotor pole oscillates back and forth past its corresponding stator pole at double the line frequency for the reasons stated above; in other words it makes a complete movement back and forth during each cycle of the current. For quick starting it is necessary that the amplitude of these oscillations be built up as quickly as possible to an arc where the rotor pole swings past the midpoint between the corresponding adjacent stator poles, when the field cycle reverses, thus falling into synchronism by virtue of the fact that the stator poles are placed only 180 degrees apart.

Obviously, the moment of inertia of the rotor system should be low for a quick build up of the starting oscillations, assuming a given magnetic moment, and large enough to enable stable operation of the rotor by "flywheel action" when the rotor is subjected to pulsating torques, especially if the torques cause nearly simple harmonic motion between the stator poles. This build up of the oscillations is aided by the impulse imparting member 43 as will be explained hereinafter.

Figure 6:
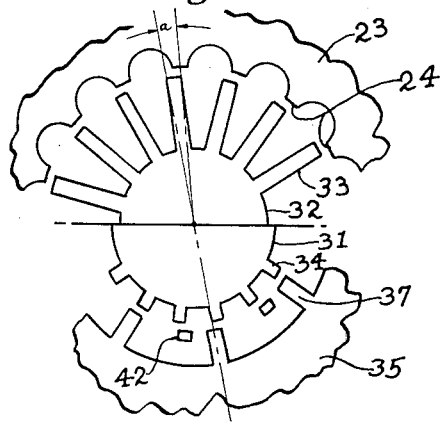
Fig. 6 is a diagrammatical view showing on one plane the relative angular positions of the various rotor and stator poles at the most unfavorable starting position.

The magnetic and electromagnetic forces giving rise to the rotor torque are obviously transmitted across the radial and axial air gaps. They are not in the same plane nor do they operate with the same radius or leverage. Though the forces at the radial gap have a radial component and those at the axial gap a large axial component, both have a tangential component which is all that need be considered so far as torque is concerned. Therefore both axial and radial components are diagrammatically represented in a single plane in Figs. 6 and 11 so that the three cooperating torques may be visualized. In the case of the motor illustrated the radial stator teeth 24 are placed about 5½ degrees clockwise from the shell teeth 37 which represents 45 electrical degrees, and this angle is indicated as angle $a$. The upper part of this figure shows the relative position of the radial teeth 33 with respect to the outer stator teeth 24, and the lower part depicts the simultaneous position of the axial rotor teeth 34 with respect to unshaded core teeth 37 on the outer core shell and the shaded teeth 42 on spider 41. The position assumed in Fig. 6 is the most unfavorable position for starting and may be referred to as zero angle. It is the position of minimum resultant torque as determined by overloading the motor to the pull out or stall torque. In this position it will be noted that any pair of the more closely adjacent core teeth (one unshaded and the closest shaded tooth) are equidistant across the axial gap from the two proximate axial rotor teeth. Thus the resultant forces acting over a complete cycle will be balanced between clockwise and counter-clockwise. This is made more clear in the torque-time diagram Fig. 8.

Figure 7:
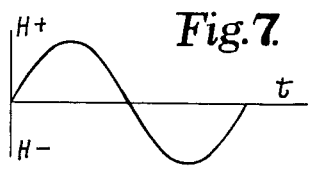
Fig. 7 shows the curve representing the sinusoidal field strength produced by the field coil when energized.
Figure 8:
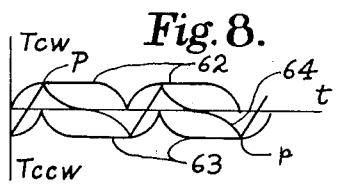
Fig. 8 shows the clockwise and counterclockwise torques and their summation, exerted on the rotor by the axial stator system at the position shown in Fig. 6.

In Fig. 7, H represents the sinusoidal field over a complete cycle. In Fig. 8 curve 62 represents the clockwise torque curve acting between one unshaded shell tooth 37 and its closest rotor tooth which is always positive because the forces are attractive even when the field reverses. In like manner 63 is a curve of the torque produced by the attractive forces acting between a shaded or spider tooth and the closest rotor tooth which in this case is counter-clockwise because of the different relative positions. It will be noted that the zero positions of the torque 63 lag behind the zero positions of H due to the action of the shading rings.

In this position the flux flowing across the gaps between the unshaded or shell teeth 37 and the proximate axial rotor teeth, which is substantially in phase with the field H, produces a clockwise torque, whereas the flux flowing across the gaps between the shaded or spider teeth 42 and the proximate rotor teeth produces a counter-clockwise torque. The curves of these torques are shown as comparatively flat because the axial rotor and stator teeth are purposely made of such small cross-section that they are worked at saturation. As the field H reverses, it will be noted that the direction of either the clockwise or the counter-clockwise torque does not reverse because the force acting across a short air gap in like magnetic materials is always attractive regardless of the direction of flux flow and roughly proportional to the square of the flux density. Combining the two torques the result is the curve 64 showing a zero value for most of the cycle but having two clockwise peaks P and two similar counter-clockwise peaks $p$. The average of these two torques, assuming that the rotor remains at zero angle, will be zero. However if such a system is moved out of this position and the moment of inertia is very low, the rotor will oscillate due to the difference in phase between the torque peaks P and $p$ and possibly break into rotation in either direction.

Now turning to a consideration of the torque produced by the radial rotor and stator poles or teeth 33 and 24 respectively, it will be noted that the flux flowing across the radial gap is not only less than that flowing across the axial gap because of the large leakage factor, but also the flux density is less (always below saturation) because of the relatively much larger cross-sectional area of the radial rotor and stator teeth. Furthermore the radial air gap is comparatively wide, about .020", so that allowable manufacturing tolerances will not produce an objectionable variation in the relatively low forces involved. Thus, unbalanced radial forces are kept to a minimum whereby long bearing life is assured. However the arrangement is such that the average torque produced in the radial component is about equal to the average of either of the torques produced in the axial component. Assuming the radius of the radial rotor component to be twice that of the axial component (it is preferably more than twice) the forces acting at the radial air gap are of the order of ¼ those at the axial gap, since there are also twice the number of poles acting radially as are acting to produce either of the torques at the axial air gaps.

Figure 9:
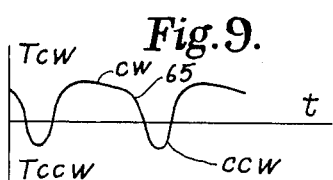
Fig. 9 shows the clockwise and counterclockwise torque exerted on the rotor by the radial stator poles at the position of Fig. 6.
Figure 10:
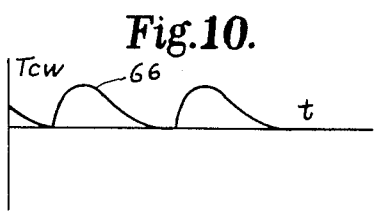
Fig. 10 shows the summation of all three torques exerted on the rotor at the position shown in Fig. 6.

The torque time curve for the radial component at the zero angle position of the rotor is designated 65 in Figure 9 and an important difference is that it shows both clockwise $T_{cw}$ and counter-clockwise $T_{ccw}$ parts. During the first and the third quadrants of magnetization or hysteresis loop of the high retentivity steel radial teeth the force acting across the radial air gap is attractive giving a clockwise torque, but when the field reverses the retained or residual magnetization of the high carbon steel does not at once reverse and so causes a force of repulsion of counter-clockwise torque for an appreciable time in the second and fourth quadrants. The magnetic polarity of the soft iron stator teeth 24 at any instant of time is the same as that of the lower part of the core and changes in phase with the field. This curve is plotted with the same time sequence as the field H in Fig. 7. It starts out with a slight $cw$ value, then dips to a $ccw$ value which is about in line with the peak P in Fig. 7, then rises to $cw$ for the remainder of the first half cycle and briefly into the second half cycle where it again dips to $ccw$ before rising again to the second $cw$ portion in the second half cycle. The curve 66 in Fig. 10 is the summation of all torques at the axial air gap. At some points the $ccw$ portions of one are approximately cancelled by $cw$ portions of the other and the resultant average 66 is high clockwise. While 66 is essentially zero for two brief intervals in each complete cycle the duration of each is only about one four-hundredths of a second, which is an entirely different matter from having a low or zero point in the torque curve of a permanent magnet rotor which persists independent of time, because the flux from a permanent magnet is essentially constant.

Figure 11:
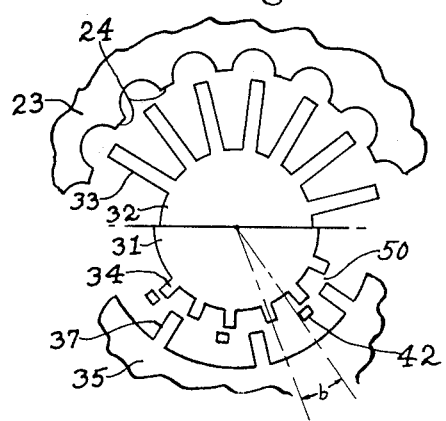
Fig. 11 shows the position of the rotor when turned through the angle $b$ to a position of maximum torque.

It will of course be understood that these torque time curves are what may be termed "qualitative" since it is impossible to calculate the exact forces involved. They are intended to give an approximate picture of the forces acting to start oscillation of the rotor at what may be considered the most unfavorable starting position. In a sense they are not realistic because they assume the rotor remains fixed during a complete cycle of the current. Since it is impossible to plot the complete torque time space (or position) functions it may be helpful to consider briefly the torques acting at a position on Fig. 11 where the rotor has been moved through angle $b$ from the position shown in Fig. 6. This position in Fig. 11 is the position of maximum torque. This position can be readily determined by turning the rotor by hand when the coil is energized.

As stated above in both Fig. 6 and Fig. 11 the angular position ($a$) of the radial stator teeth 24 in respect to the inphase, central core teeth 37 is about 45 electrical degrees. This is a preferred, but not necessarily the only position in which they may be set. The same angular relationship may if desired be obtained by setting the stator teeth 24 and 37 in line and shifting the angular position of the rotor teeth 33 and 34 relative to each other accordingly, the axial relationship remaining the same.

Figure 12:
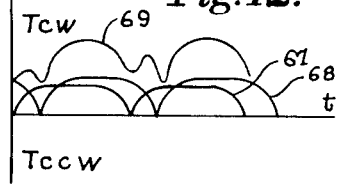
Fig. 12 shows the clockwise torques and their summation exerted on the rotor by the axial stator system at the position shown in Fig. 11.
Figure 13:
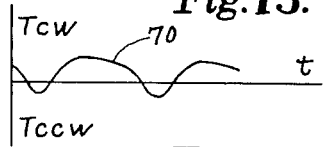
Fig. 13 shows the clockwise and counterclockwise torque exerted on the rotor in position shown in Fig. 11 by the radial stator poles.

In Fig. 12 the curve 67 represents the torque caused by the in-phase shell teeth 37 and the axial rotor component, curve 68 the torque caused by the shaded teeth 42 and the axial rotor component and curve 69, the sum of the two. In Fig. 13 curve 70 shows the torque produced by the radial rotor and stator components, and in Fig. 14 curve 71 is the summation of all torques.

Figure 14:
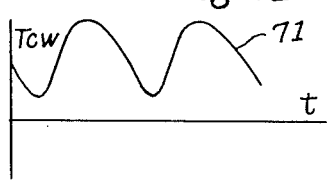
Fig. 14 shows the summation of both the axial and radial torques acting on the rotor in the position shown in Fig. 11.

In Fig. 14, it can be easily seen that the static torque is much higher than in Fig. 10 because all the torques are acting in a clockwise direction.

Figure 15:
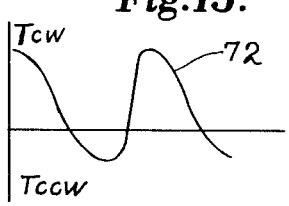
Fig. 15 represents the torque acting on the rotor when running at synchronous speed.

In Fig. 15 curve 72 indicates the torque plotted against angular position, acting on the rotor at synchronism as nearly as it can be determined by an approximate vector analysis, as a radial rotor tooth passes from one stator pole to the next stator pole. It will be noted that this torque curve is quite similar to the torque curve of a swinging pendulum which gives rise to a simple harmonic motion.

When the exciting coil is energized the rotor starts oscillating at double the line frequency, forced back and forth by the three out of phase torques because the resultant torque impulses 66 are double line frequency.

The manner in which the resonant impulse member 43 aids in starting will now be considered. It will be understood that a mechanical system will have a natural period of oscillation about an axis if acted upon by a sinusoidal torque, which natural period, for any given forces acting to cause oscillation, is proportional to the square root of $I$ where $I$ is the moment of inertia of the mechanical system about the axis. This is analogous to the natural period of a swinging pendulum which is proportional to the square root of 1, the length of the pendulum.

Examination and analysis of the curve of flux flowing through the rotor teeth by means of search coils and oscilloscope shows that a large second harmonic is present at the time when the rotor is oscillating and before it breaks into synchronism. Now since the disc 43 is calculated to have as nearly as possible a moment of inertia which is ¼ that of the rotor (about the same axis), it will have a natural period ½ that of the rotor (assuming the same forces acting) and thus be resonant with the peaks or fluctuations in torque caused by the second harmonic in the flux curve.

It can readily be seen that a curve such as shown in Fig. 10 has a large second harmonic. Now, it is desirable to make use of this second harmonic to bring the rotor oscillations up to the arc where synchronous rotation starts at the earliest possible time.

Figure 3:
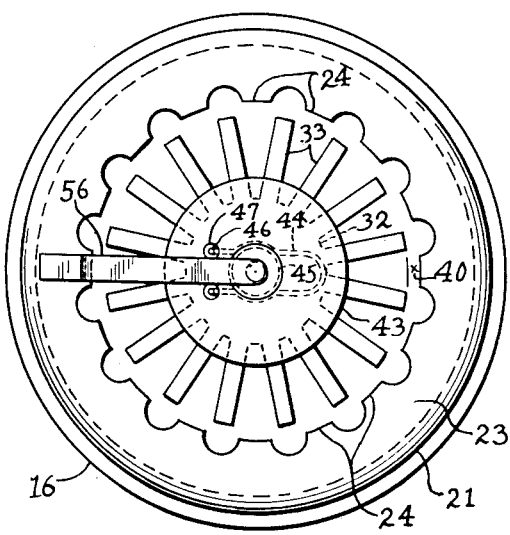
Figure 3 is a top plan view with the cover removed.

It will be noted that the disc 43 is allowed to freely float on the shaft 27 through a small angle by making the holes 47 larger than the ends of the engaging constant friction spring 46 as shown in Figure 3. It may be considered that energy is thus stored in the spring at the end of each oscillation due to the lost motion connection between the spring and disc.

Now as the rotor starts small oscillations, the ends of the spring 44 will strike the disc 43 and set it in forced vibration in accordance with its natural period as determined by its moment of inertia and the constant of the spring 44. This period is one half that of the rotor proper. The phase of these second harmonic vibrations in respect to the rotor proper may be any angle because the motion of the disc about the shaft 27 is constrained only by the friction of the spring 44 on its groove in hub 29. This friction torque is about as large as the normal rotor torque in synchronism.

After the rotor comes into synchronous rotation the disc will of course rotate with the rotor. It may also have the effect of smoothing out any unevenness in the rotor rotation.

Because the disc 43 is free to take any relative angular position around the rotor shaft subject to the restraining action of the constant friction spring, its phase angle will soon reach a position where the second harmonic oscillation will beat with the fundamental of the rotor and thus impart a momentary impulse to the rotor to cause it to increase its arc of oscillation and thus swing into synchronism.

To return to the analogy of the pendulum, the action of the disc is quite similar to suddenly giving the pendulum bob an extra push at one end of its stroke causing it to swing through a greater arc at the other end of its stroke. In this sense, the disc may be said to impart a momentary external force to the rotor proper.

A spring having the desired constant and characteristics can easily be determined by trial for any particular set of conditions, for example in a motor using a stainless steel disc .8 inch in diameter by 1/32 inch in thickness a U-shaped spring of .015 inch piano wire extending about 5/8 inch from each side of the center line of the shaft, and where the holes in the disc are 1/16 inch in diameter, will work very well to accomplish the desired result.

As a result of my invention it will now be evident that by utilizing my novel combination of principles, a small synchronous timing motor may be made which will produce relatively high toque without the use of permanent magnets, which will have an exceptionally long useful life, and which can be manufactured at a cost which will be competitive with the extremely low power motors now available, and yet which may be used where higher output motors are required.

While I have illustrated and described one embodiment which my invention may assume in practice, it will be understood that various other embodiments may occur to engineers in this general field after consideration of the above disclosure. The intention is that all of such embodiments and variations shall be embraced by the claims which follow.

What I claim as new and desire to secure by Letters Patent is:

1. In a single phase synchronous motor, a coil to create an alternating magnetic field, a stationary central core and a cup-shaped member attached to said core and surrounding said coil, said core providing a plurality of stator pole pieces at one end thereof, said cup-shaped member having a series of teeth which extend radially inwardly to provide a second set of stator poles having a fixed angular displacement with respect to the pole pieces on said core, and a rotor having one component with a plurality of axially extending teeth opposite said core pole pieces and separated therefrom by an axial air gap, and a second rotor component having radial teeth extending into proximity with said second set of stator poles, the second rotor component being fixed to the first rotor component so that said radial teeth have a fixed angular displacement relative to the axially extending teeth of the first rotor component, whereby an alternating flux passes through the core, across the axial air gap into the rotor through said axially extending teeth of the first rotor component and out through the radial teeth of the second rotor component, across the radial air gap into the outer stator teeth and back through the outer cup-shaped stator member.

2. In a single phase synchronous motor, the combination defined in claim 1 wherein said core consists of inner and outer parts to divide the flux into two parallel paths, some of said pole pieces being on one part and some on the other, and means to cause the flux in one path to lag behind the flux in the other path.

3. In a single phase synchronous motor, the combination defined in claim 1 wherein said core consists of inner and outer parts to divide the flux into two parallel paths, one half of said pole pieces being on the inner part and the other half being on the outer part, and shading rings surrounding the inner part to cause the flux in the inner path to lag behind the flux in the outer path.

4. In a single phase synchronous motor, the combination defined in claim 1 wherein said core consists of an inner part, an outer shell concentric with but spaced from the inner part, means for shading the inner part but not the outer shell, said shell terminating in a series of teeth equal in number to one half of the axially extending rotor teeth and providing one half of the first set of stator poles, and a spider attached to said inner part having teeth extending outwardly so that one such tooth is located in each of the spaces between the teeth on the outer shell and providing the other half of said first set of stator poles, said spider teeth being fixed in a position all to one side of the center lines of the spaces between the outer shell teeth.

5. In a single phase synchronous motor, the combination defined in claim 1 wherein the second rotor stator combination at the radial air gap is of substantially larger diameter than the first rotor stator combination at the axial air gap, the radial air gap being substantially greater than the axial air gap and the cross-sectional area of the rotor and stator teeth at the radial air gap being substantially larger than the cross-sectional area of the rotor and stator teeth at the axial air gap, all for the purposes described.

6. In a single phase synchronous motor the combination as defined in claim 1 wherein the radial teeth of the second rotor component are of hardened high carbon steel, whereas the cooperating stator component is of iron or soft steel.

7. In a self-starting synchronous motor, a coil to create an alternating magnetic field, a rotor having a component with a plurality of salient poles mounted to rotate in said field, a stator element surrounding said rotor and presenting pole pieces separated from said rotor poles by a radial air gap, said rotor component and said stator element being made of materials of markedly different magnetic retentivity so as to impart an alternating torque to the rotor, and means to impart another torque to the rotor out of phase with the first torque including another rotor component with salient poles having a fixed angular displacement with respect to the first mentioned rotor poles and a stator element cooperating with said other rotor component across a different air gap.

8. A self starting synchronous motor having a single exciting coil and a rotor and stator provided with three distinct rotor and stator pole combinations so constructed and arranged with respect to one another that they produce three differently phased torques when acted upon by the alternating flux set up by said coil.

9. A self starting synchronous motor as defined in the preceding claim in which the rotor and stator poles are each mechanically fixed so that the stator poles in only one of three combinations can at any one time be in alignment with the cooperating rotor poles.

10. A self starting synchronous motor according to claim 8 in which the resultant torque produced by the three rotor stator pole combinations causes the rotor to oscillate when starting at double the line frequency, together with means for imparting a momentary external force to the rotor whereby the amplitude of the rotor oscillations is increased to the point where the rotor breaks into synchronous rotation.

11. A self starting synchronous motor according to claim 10 wherein said means for imparting a momentary external force comprises a disc floatingly mounted on said rotor, a resilient element frictionally connected to the rotor, and having also a lost motion connection with the disc, the moment of inertia of said disc about the rotor axis being substantially ¼ that of the rotor per se, so that said member is resonant with the fluctuations of torque caused by the second harmonic of the flux in the rotor poles.

12. A self starting synchronous motor as defined in claim 8 wherein the material of the rotor poles in one of the rotor stator pole combinations is of substantially different magnetic retentivity as compared to the material of the corresponding stator poles.

13. A self starting synchronous motor having an exciting coil to create an alternating magnetic field, a rotor shaft extending centrally through said coil, a stationary core surrounding said shaft and consisting of an inner part and an outer part or shell fixed to the inner part at its base, said core parts being of soft iron or steel and serving to divide the flux flowing through the core into inner and outer paths, said shell terminating at its upper end in a plurality of equally spaced axially extending teeth providing one set of stator core poles, means, also of soft iron or steel, fixed to said inner core part and carrying teeth equal in number to the shell teeth and extending into the spaces between said shell teeth to provide a second set of stator core poles, the upper faces of all the teeth providing said stator core poles being flat in a plane perpendicular to the rotor shaft, a shading coil surrounding said inner core part to cause the flux flowing therethrough to lag behind the flux in the unshaded shell by a number of electrical degrees, said second set of core teeth carrying the inner path flux being offset a predetermined number of electrical degrees from the mid position with respect to the shell teeth, a rotor component of soft iron or steel mounted on said shaft above said core and having around its periphery a series of equally spaced axially extending teeth providing rotor poles equal in number to the core poles (both sets), said axial rotor teeth having flat bottom surfaces in a plane perpendicular to the shaft and separated from the top surfaces of said core teeth by a narrow axial air gap, a second rotor component fixedly mounted on the shaft above said first rotor component and in magnetic contact therewith and having radially outwardly extending spokes or teeth providing a second set of rotor poles equal in number to the poles on said first rotor component and fixed in position angularly to one side of said first rotor poles a predetermined number of degrees, an outer stator member surrounding said second rotor component and having radially inwardly extending teeth providing stator poles corresponding to the radial rotor poles and separated therefrom by a radial air gap relatively wider than said axial air gap, the materials of said radial rotor teeth and of said radial stator teeth having markedly different properties of magnetic retentivity, and a cup-shaped member of soft iron or steel surrounding said coil and attached to said outer stator member and the base of said core.

14. A motor as defined in claim 13 wherein the cross-section of said axial rotor and core teeth are of sufficiently small cross-section that they are saturated by the magnetic flux over a substantial part of the cycle.

15. A motor as defined in claim 13 wherein a collar of non-magnetic material is fixed to the upper end of the shaft, which collar carries both of said rotor components, and a flange on the collar between said first rotor component and the inner core part to direct a major part of the flux from the core into the rotor teeth.

16. A motor as defined in claim 13, and a magnetic shunt extending between the coil cup and the core.

17. A motor as defined in claim 13, and a ring of soft iron or steel fitted against the inner wall of said cup-shaped member overlying the coil, and the inner edge of which is separated from the core by an air gap of predetermined width.

18. A motor as defined in claim 13, wherein a sleeve bearing fixed in the inner core part gives radial support to the shaft, and wherein a self aligning thrust bearing preferably of the flat jewel type supports the end of the shaft against axial forces acting across the axial air gap.

References Cited in the file of this patent

UNITED STATES PATENTS 2,081,993     Gebhardt et al.   ---------- June 1, 1937